Figure 1:
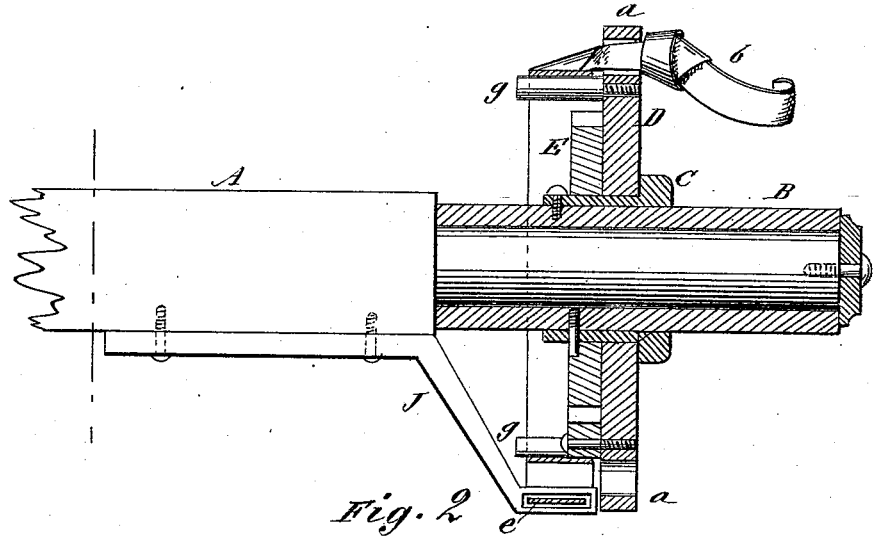

G. L. KENYON.
Vehicle Device for Checking Horses.

No. 196,362. Patented Oct. 23, 1877.

WITNESSES:
C. Neveux
J. H. Scarborough

INVENTOR:
G. L. Kenyon.
BY
ATTORNEYS.

UNITED STATES PATENT OFFICE.

GEORGE L. KENYON, OF LONSDALE, RHODE ISLAND.

IMPROVEMENT IN VEHICLE DEVICES FOR CHECKING HORSES.

Specification forming part of Letters Patent No. 196,362, dated October 23, 1877; application filed September 1, 1877.

*To all whom it may concern:*

Be it known that I, GEORGE L. KENYON, of Lonsdale, in the county of Providence and State of Rhode Island, have invented a new and Improved Horse-Hitching Attachment Applied to Vehicles, of which the following is a specification:

The invention will first be described in connection with the drawing, and then pointed out in the claim.

Figure 2:
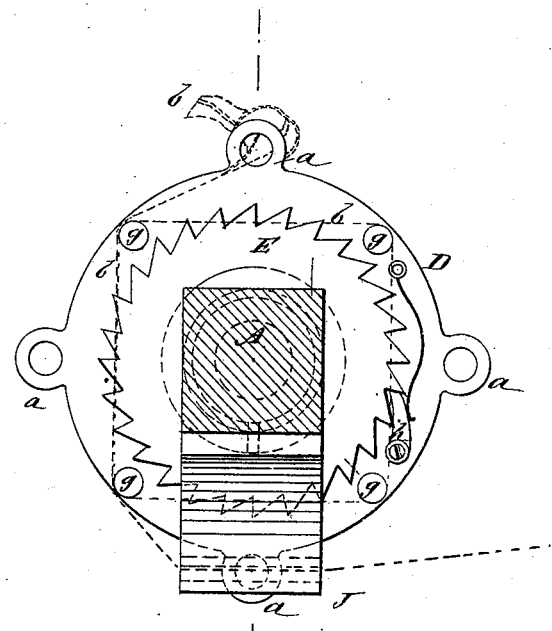

In the annexed drawing, Figure 1 is a sectional view of my improvement applied to the hub of a wheel. Fig. 2 is a cross-section through the axle, looking outward.

Similar letters of reference indicate corresponding parts.

The letter A designates the axle of a vehicle, on which the hub B is applied in the usual well-known manner; and C designates a collar, which is secured fast to the hub on the inner side of the wheel. (Not shown in the drawing.) On this collar a disk, D, is loosely applied, so that it will turn freely, and on the circumference of this disk a number of rings, $a$, are formed, which are adapted to have attached to them a line, $b$, hereinafter again referred to.

On the inner side of the disk D are fixed a number of studs or reel-arms, $g$, around which the line $b$ will be wound; and within the circle of these studs or reel-arms, and rigidly secured to the collar C, is a ratchet-wheel, E, with which a pawl, $h$, engages. This pawl is pivoted to the disk D, and locks this disk to the hub B when engaged with the ratchet-wheel.

J designates a bracket, which depends from the end of the axle A, and has a slot, $e$, through it, through which the line $b$ passes freely. This slot serves as a guide for the line, and holds it in a proper position relative to the reel-arms $g$, so that it will be wound on these arms with certainty.

The line $b$ is attached to the bit of the animal, and the rear end of this line may have a snap-hook attached to it.

When the horse is stopped, and it is desired to leave him, the rear end of the line $b$ is attached to one of the rings $a$ on disk D. Should the horse then start, the line $b$ will be wound on the reel-arms $g$, and draw hard on the bit, thus stopping the horse. Should the horse back, the pawl-and-ratchet connection will prevent injury.

Having thus described my invention, what I claim as new, and desire to secure by Letters Patent, is—

The loose disk D, connected by pawl and ratchet with a fixed collar, E, having the rings $a$, and provided with the arms $g$, in combination with the slotted axle-bracket J, as and for the purpose specified.

GEORGE LEONARD KENYON.

Witnesses:
F. S. KENYON,
I. M. KENYON.